United States Patent [19]

Troyen

[11] Patent Number: 4,494,567
[45] Date of Patent: Jan. 22, 1985

[54] APPARATUS FOR SUPPLYING A FLOW OF LIQUID TO A TURBINE

[76] Inventor: Harry D. Troyen, 351 N. 5th St., Reading, Pa. 19601

[21] Appl. No.: 483,147

[22] Filed: Apr. 8, 1983

[51] Int. Cl.³ .............................................. F03B 13/10
[52] U.S. Cl. ................................. 137/561 A; 290/43; 290/52
[58] Field of Search ....................... 137/561 A, 561 R; 290/52, 43

[56] References Cited

U.S. PATENT DOCUMENTS

| | | | |
|---|---|---|---|
| 2,164,011 | 6/1939 | Hilborn | 137/561 A |
| 3,750,001 | 7/1973 | McCloskey | 290/52 |
| 3,972,642 | 8/1976 | Fricke et al. | 415/158 |

FOREIGN PATENT DOCUMENTS 2512074  10/1975  Fed. Rep. of Germany ... 137/561 A

*Primary Examiner*—A. Michael Chambers

*Attorney, Agent, or Firm*—Albert L. Free

[57] ABSTRACT

A conduit construction which enhances the flow of liquid to a turbine when the rate of flow from the liquid source is low, and which limits the flow to the turbine when the flow rate from the source is high. The turbine is placed in a branch conduit which communicates with the interior of a larger main conduit through an opening in the side of the main conduit near its bottom. A flow diverter in the form of a vertically concave wall extends from the downstream side of the opening across the bottom segment of the main conduit, curving upstream as it does so; the wall stops below the top of the interior of the main conduit, leaving room for liquid to flow over it. When the flow rate is small, the diverter collects all of the liquid stream in the main conduit and delivers it to the branch conduit; when the flow in the main conduit becomes excessively high, it flows in part over the diverter, thus mitigating the tendency for the liquid to back up in the main conduit.

4 Claims, 8 Drawing Figures

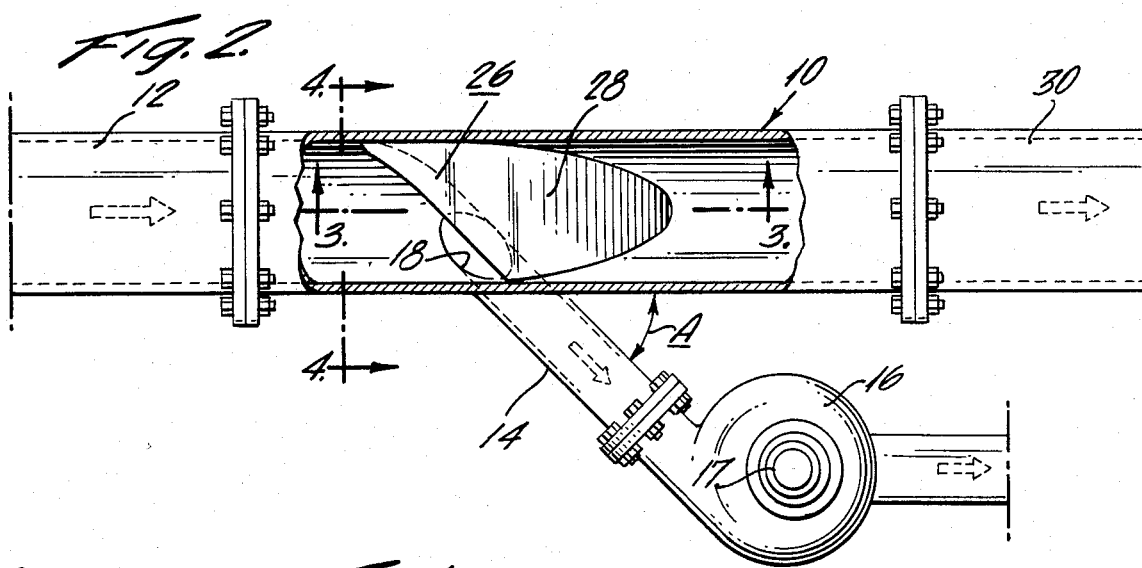
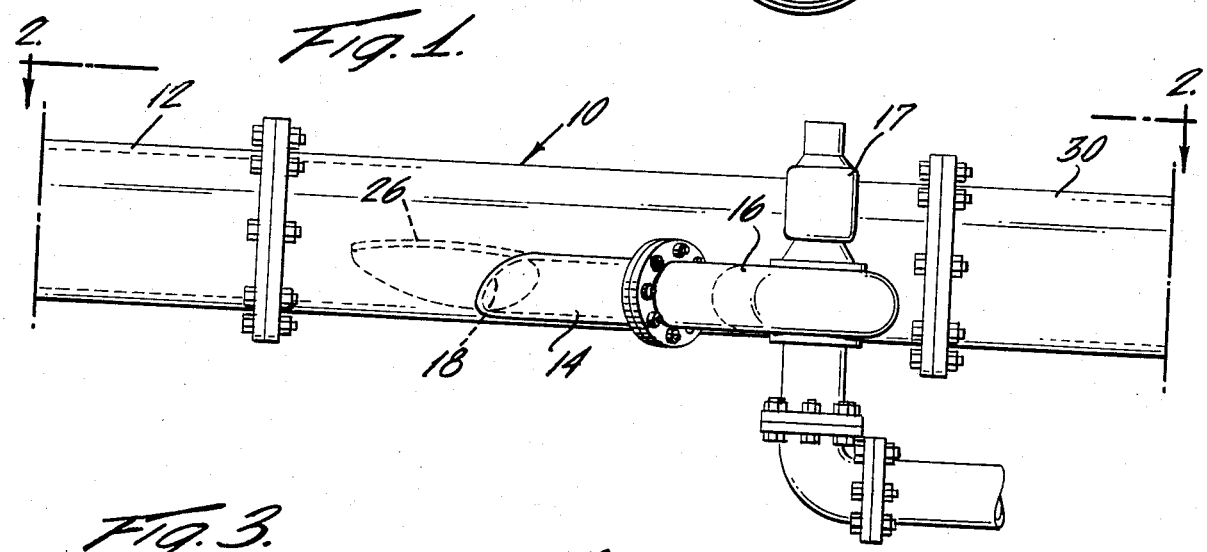
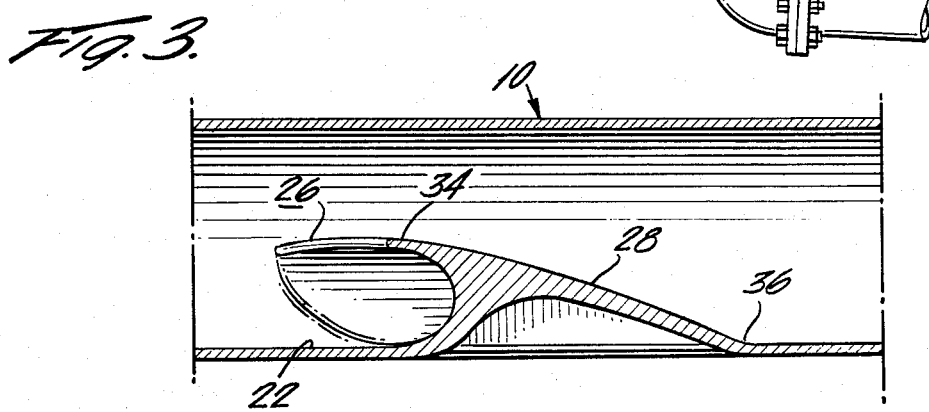
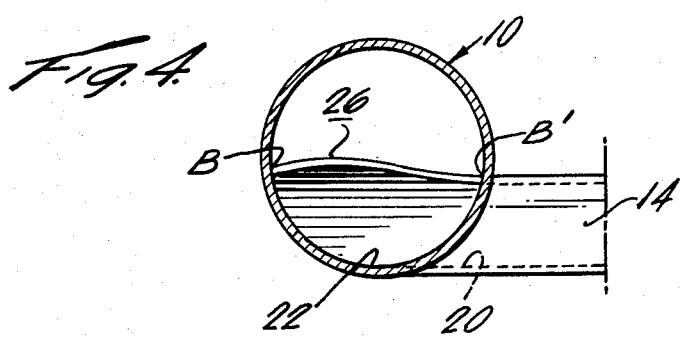

4,494,567

APPARATUS FOR SUPPLYING A FLOW OF LIQUID TO A TURBINE

BACKGROUND OF THE INVENTION

There are a variety of applications in which it is desirable to supply a flow of liquid to a turbine to cause it to rotate, thereby to generate mechanical and/or electrical power. There are also many cases in which the flow of liquid naturally available is not always equal to that which it is desired to have available for driving the turbine. For example, the rate of flow from the source may be at a highly variable rate, sometimes being below the optimum flow rate and other times being well in excess of the maximum desired flow rate; currents flowing at a very high per rate can readily produce undesired back-up of the liquid in the conduit supplying the turbine.

As an example, in U.S. Pat. No. 4,352,024 of Harry D. Troyen, entitled System for Generation of Electrical Power and issued Sept. 28, 1982, there is shown a system for generating electrical power from the flow of waste liquid, and a special arrangement is shown for operating one or more valves to bypass a substantial part of the liquid flow when it occurs at too high a rate, so as to avoid excessive flow through the turbine and excessive backup of the liquid in the supply line. While such valving arrangements can operate successfully, they do require special relatively expensive apparatus involving a number of moving parts.

Accordingly, it is an object of the present invention to provide apparatus for controlling the flow of liquid to a turbine, which apparatus does not require any moving parts.

Another object is to provide such apparatus which is inexpensive and extremely reliable.

SUMMARY OF THE INVENTION

These and other objects of the invention are realized by the provision of apparatus for supplying a flow of liquid to a turbine from a source of liquid flowing at a variable rate, comprising a main conduit for receiving a variable flow of liquid from the source and a branch conduit connected to the main conduit for supplying a flow of the liquid from the main conduit to the turbine; the branch conduit is preferably of smaller cross-section than the main conduit and communicates with the interior of the main conduit by way of an opening in a side wall of the main conduit. Flow-diverter means are employed inside the main conduit which extend across the bottom of the main conduit from the side-wall opening, for diverting substantially all of the flow of liquid from the main conduit into the branch conduit by way of the side-wall opening when the rate of flow of the liquid is less than the predetermined value for which the level of the liquid is at the top of the flow-diverter, and for permitting the excess flow of the liquid to pass over the diverter means and down the main conduit when the rate of flow exceeds said predetermined value.

With this apparatus, at low rates of flow the entire flow is applied to the turbine and none continues down the main conduit, so that even at relatively low rates of flow in the main conduit the turbine may be operated properly; however, for very high flow rates in the main conduit, a large proportion of the flow occurs over the flow-diverter means and on down the main pipe or conduit, thereby preventing backup of the liquid in the main pipe while at the same time providing the desired flow of liquid to the turbine.

Preferably the apparatus of the invention also comprises a downwardly-sloping ramp, extending downstream from the top of the flow diverter means to the bottom of the main conduit, which substantially eliminates the turbulence and impedance to flow which would tend to occur at the downstream side of the flow diverter means if such ramp were not employed.

Also, in preferred embodiments the flow-diverter means comprises a curved wall extending from the downstream side of the side-wall opening, along and completely across a bottom segment of the cross-section of the main conduit, said wall being concave along both its vertical dimension and its horizontal dimension as viewed from upstream; preferably also, the branch conduit extends from the opening in the side wall of the main conduit at an acute angle to the downstream portion of the main conduit; the bottom of the opening is substantially at the level of the bottom of the adjacent cross-section of the main conduit; and the top of the opening is substantially at the level of the top of the adjacent curved wall of the flow-deflector means.

BRIEF DESCRIPTION OF FIGURES

These and other objects and features of the the invention will be more readily understood from a consideration of the following detailed description, taken in connection with the accompanying drawings, in which:

FIG. 1 is a side view of a conduit assembly embodying the invention in a preferred form;

FIG. 2 is a top view of same, with part of the top of the central main conduit broken away to show the flow-diverter and ramp within it;

FIG. 3 is an enlarged, fragmentary, sectional side view taken along lines 3—3 of FIG. 2;

FIG. 4 is an enlarged sectional view taken along lines 4—4 of FIG. 2;

DESCRIPTION OF PREFERRED EMBODIMENTS

Figure 5:
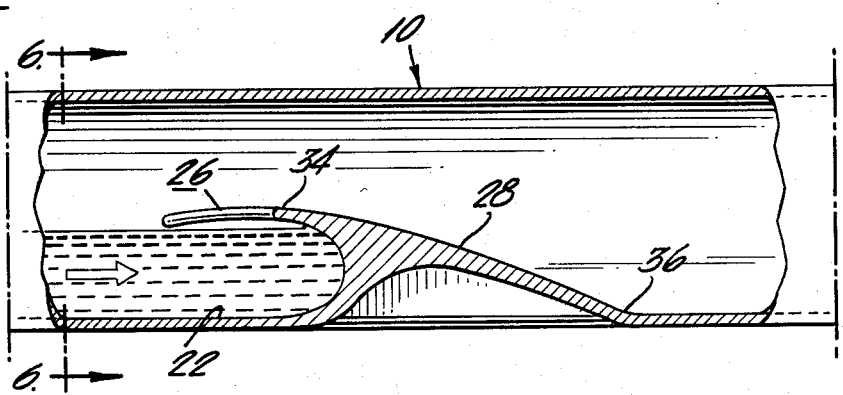
FIG. 5 is an enlarged fragmentary side view, with parts broken away, illustrating the condition of a relatively low rate of liquid flow, for which the top of the liquid is below the top of the flow diverter.

Referring now to the embodiment of the invention shown by way of example in the drawings, in this example a main conduit 10 is provided which is of uniform circular cross-section, and is supplied at its inlet end from a supply conduit 12 with a flow rate of liquid which may be of variable rate; in a preferred embodiment the liquid flow consists of waste water from a commercial or industrial enterprise. A branch conduit 14 extends from one side of conduit 10 adjacent the bottom thereof, and serves to deliver a flow of liquid from the main conduit to the turbine 16, shown schematically. Assuming, as in the above-referenced U.S. Pat. No. 4,352,024, that the flow of liquid into the main conduit can at times be near zero, and assuming that the turbine is used to generate alternating electrical current, it is understood that when the liquid flow is zero or very small the output of the generator 17 may be, in effect, disconnected from any power lines to which it is auxiliary, as described also in the above-described patent. In all of the Figures, mechanical supports for the conduits, turbines and generator have not been shown, in the interest of clarity and simplicity, since they may be entirely conventional and their use will be obvious to one skilled in the art.

In this preferred embodiment, branch conduit 14 extends at an acute angle A with respect to the axis of the main conduit; in the preferred embodiment A is about 45°. The branch conduit communicates with the interior of the main conduit through the opening 18, which opening has an outline corresponding to the intersection of the cylindrical branch pipe with the lower side portion of the main cylindrical conduit. Preferably the bottom 20 of the interior of the branch pipe is at about the level of the bottom of the interior of the main conduit 22 (FIG. 4). The two conduits may be held together and sealed by welding, soldering, brazing, etc.

Figure 6:
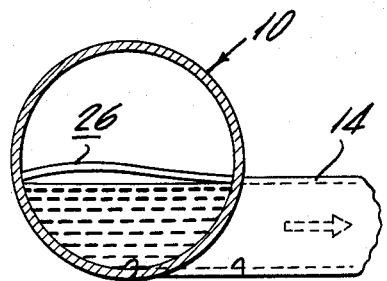
FIG. 6 is a sectional view along lines 6—6 of FIG. 5.

Within the main conduit 10 are positioned the flow-diverter means 26 and the turbulence-inhibiting ramp 28. The flow-diverter means extends from the opening 18 across the bottom segment (B to B' in FIG. 4) of the main conduit, merging smoothly with the interior of the branch conduit 14 at one end and curving upwardly, i.e. in the upstream direction, as it traverses the width of the bottom segment of the main conduit. Any section of the flow-diverter means taken at right angles to its longitudinal axis exhibits a concave form (see FIG. 5) and, as above noted, the flow-diverter means is also concave along its length. The wall making up the flow-diverter means is substantially an extension of the downstream half of the branch conduit, and it serves to trap substantially all liquid flow occurring at a level below the top of the flow diverter, and to smoothly divert this flow into the branch conduit, as illustrated in FIGS. 5 and 6.

Figure 7:
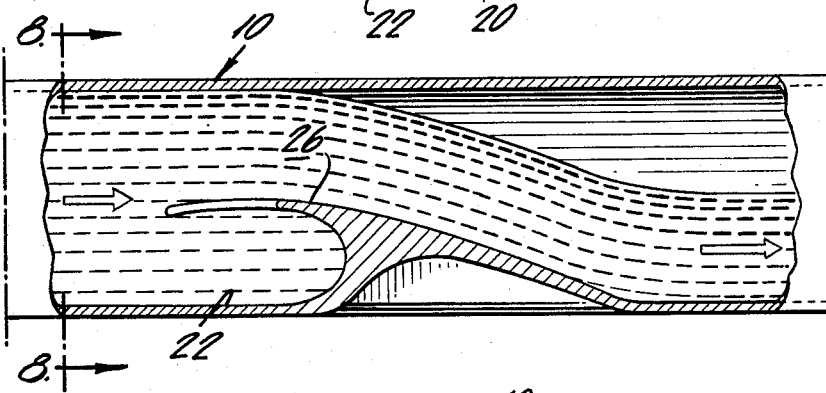
FIG. 7 is a view like that of FIG. 6, but with a higher liquid flow rate such that the liquid flows, in part, over the diverter.
Figure 8:
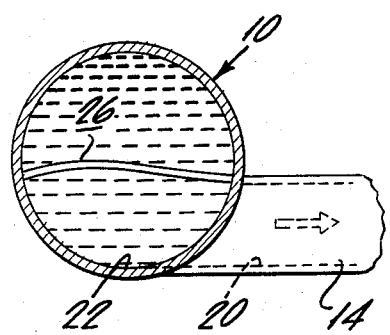
FIG. 8 is a sectional view taken along lines 8—8 of FIG. 7.

When the variable flow from the supply conduit 12 into the inlet end of the main conduit 10 increases so that the level of the liquid in the main conduit is above the top of the flow-diverter means, the excess flow will pass over the flow-diverter means and proceed downstream through the main conduit to an exhaust conduit 30, whence it may be exhausted to the ambient, as shown in FIGS. 7 and 8. In this way, undesired backup of the liquid into the supply conduit 12, which would occur if the entire high rate of flow had been applied to the smaller branch conduit, is relieved and avoided.

The ramp 28 downstream of the flow-diverter means slopes downwardly in the downstream direction, from the top of the flow-diverter means at 34 to the bottom of the main conduit at 36, and may be welded, soldered or brazed around its edges to hold it in position and to provide an appropriate liquid seal. Because it provides a smooth, gradual, transition between the reduced cross-section of the interior of the main conduit at the flow-diverter means and its full height downstream of the diverter means, the ramp minimizes greatly the high degree of turbulence which might otherwise exist under high flow conditions, and thus provides a smoother flow not only into the branch tube, but also onward along the interior of the main tube under conditions of high flow rate.

In one typical preferred embodiment, the main conduit may have a diameter of about 30" and the branch conduit a diameter of about 12".

Accordingly, there has been provided an apparatus by means of which all of the flow from a variable liquid-flow source is diverted into the turbine supply conduit when the flow rate is low, so as to utilize it most effectively at such times, and which still provides a high-flow, low-impedance outlet for liquid flow when the rate of supply of liquid increases greatly. This minimizes the tendency for the main flow to backup in the supply pipe under conditions of high flow rate, and is accomplished by a completely inactive device which requires no sensors, no moving parts, no valves and no wiring or linkages. Accordingly, it is both inexpensive and extremely reliable.

While the invention has been described with particular reference to specific embodiments in the interest of complete definiteness, it will be understood that it may be embodied in a large variety of forms diverse from those specifically shown and described without departing from the spirit and scope of the invention as defined by the appended claims.

What is claimed is:

1. Apparatus for supplying a flow of liquid to a turbine from a source of liquid flowing at a variable rate, comprising:

a main conduit for receiving a variable flow of liquid from said source;

a branch conduit connected to said main conduit for supplying a flow of said liquid from said main conduit to said turbine;

said branch conduit being of smaller cross-section than said main conduit and communicating with the interior of said main conduit by way of an opening in a side wall of said main conduit; and stationary flow-diverter means inside said main conduit extending across the bottom of said main conduit from the downstream side of said opening and extending short of the top of the interior of said main conduit, for diverting substantially all of said variable flow of liquid into said branch conduit by way of said side wall opening when the rate of flow of said liquid is less than a predetermined value for which the level of said liquid is at the top of said diverter, and for permitting excess of said liquid to flow over said flow-diverter means and down said main conduit when said rate of flow exceeds said predetermined value.

2. The apparatus of claim 1, comprising a downwardly-sloping ramp extending downstream from the top of said flow-diverter means to the bottom of said main conduit.

3. The apparatus of claim 1, wherein said flow-diverter comprises a curved wall extending from the downstream side of said opening along and completely across a bottom segment of the cross-section of said main conduit, said wall being concave along both its vertical dimension and its horizontal dimension as viewed from upstream thereof.

4. The apparatus of claim 3, wherein said branch conduit extends horizontally from said opening and at an acute angle to the downstream portion of said main conduit, wherein the bottom of said opening is substantially at the level of the bottom of the cross-section of said main conduit, and wherein the top of said opening is substantially at the level of the top of said curved wall of said flow deflector means.

* * * * *